US012639743B2

(12) United States Patent
Singh

(10) Patent No.: US 12,639,743 B2
(45) Date of Patent: May 26, 2026

(54) SYSTEM AND METHOD TO CONVERT SOCIAL MEDIA CONTENT TO DYNAMIC NON-FUNGIBLE TOKENS

(71) Applicant: Ravneet Singh, Coral Springs, FL (US)

(72) Inventor: Ravneet Singh, Coral Springs, FL (US)

(73) Assignee: Ravneet Singh, Coral Springs, FL (US)

( * ) Notice: Subject to any disclaimer, the term of this patent is extended or adjusted under 35 U.S.C. 154(b) by 202 days.

(21) Appl. No.: 18/399,887

(22) Filed: Dec. 29, 2023

(65) Prior Publication Data

US 2025/0217872 A1    Jul. 3, 2025

(51) Int. Cl.
| | |
|---|---|
| *G06Q 30/00* | (2023.01) |
| *G06Q 10/40* | (2026.01) |
| *G06Q 30/04* | (2012.01) |
| *G06Q 30/0601* | (2023.01) |
| *H04L 9/00* | (2022.01) |
| *H04L 67/306* | (2022.01) |

(52) U.S. Cl.
CPC ......... *G06Q 30/0641* (2013.01); *G06Q 10/40* (2026.01); *G06Q 30/04* (2013.01); *H04L 9/50* (2022.05); *H04L 67/306* (2013.01)

(58) Field of Classification Search
CPC ................................................ G06Q 30/0641
See application file for complete search history.

(56) References Cited

U.S. PATENT DOCUMENTS

| | | | |
|---|---|---|---|
| 2020/0242105 A1 | 7/2020 | Rich et al. | |
| 2022/0366022 A1* | 11/2022 | Goldston | ................ G06F 16/61 |

| | | | |
|---|---|---|---|
| 2022/0391887 A1* | 12/2022 | Jakobsson | ............. H04L 9/3239 |
| 2022/0407702 A1* | 12/2022 | Jakobsson | ................. H04L 9/50 |
| 2023/0070586 A1* | 3/2023 | Kapur | .................. G06Q 20/123 |
| 2023/0075884 A1 | 3/2023 | Jakobsson et al. | |
| 2023/0122552 A1* | 4/2023 | Meyers | ................... G06F 21/10 |
| | | | 463/29 |

FOREIGN PATENT DOCUMENTS

| | | |
|---|---|---|
| WO | 2022238854 A1 | 11/2022 |
| WO | 2023091733 A1 | 5/2023 |

OTHER PUBLICATIONS

Kapoor, Arnav, et al. "Tweetboost: Influence of social media on nft valuation." Companion proceedings of the web conference 2022. 2022.*

* cited by examiner

*Primary Examiner* — Kathleen Palavecino
(74) *Attorney, Agent, or Firm* — Jason C. Cameron

(57) ABSTRACT

A system and method to convert social media content to dynamic non-fungible tokens (NFT's) is provided. The system includes a user registration module to link social media accounts of a user. The system includes a contract generation module to sign and notarize a contract and a proof of agreement through a blockchain. The system includes an NFT value creation module to convert the content to NFT dynamically. The system includes a NFT marketplace module to allow the first user to buy and sell the NFT's. The system includes a payment module to monetize the assets thereby converting a second user to a paid member based on a monthly subscription. The payment module provides a social net value of the content and generates a revenue through a transaction processing fees and SaaS subscriptions. The system includes an NFT swapping module to swap types of currency of the NFT across multiple networks.

20 Claims, 5 Drawing Sheets

400

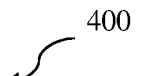

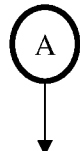

Provide a total social net value of the content based on total number of likes, mentions, hashtags, followers, viewers, subscribers, score and the likes obtained from one or more social network platforms supporting the one or more social media accounts of the first user

414

Generate a revenue through a transaction processing fees and one or more SaaS subscriptions wherein the revenue from the transaction processing fees is generated through sponsored posts and membership and revenue from the SaaS subscriptions are generated by the first user and the plurality of third-party applications

416

Allow the first user to swap type of currency of the one or more non-fungible token across multiple networks

SYSTEM AND METHOD TO CONVERT SOCIAL MEDIA CONTENT TO DYNAMIC NON-FUNGIBLE TOKENS

FIELD OF INVENTION

Embodiments of the present disclosure relate to the field of media content files, and more particularly, a system and a method to convert social media content to dynamic non-fungible tokens.

BACKGROUND

The market for virtual goods has been growing constantly since the very beginning of Internet and has achieved significant milestones. In the social media environment, famous people, movies stars, singers, athletes, and professionals become social media influencers. Consequently, the social media influencers can monetize their influence in social network in several ways, for instance through social platforms. In digital marketing, marketers, for example brands, work with the social media influencers to advertise their products and make followers familiar with the marketer. Currently, micro social media influencers are able to make huge impact in the market.

Monetizing digital assets involves generating revenue from digital content. The digital content includes several forms of online content for instance, websites, blogs, social media accounts, digital products, software, and the like. Specifically, monetizing social media accounts have several drawbacks. One such drawback includes dependency on platform policies. Social media platforms can change their policies and terms of service. This impacts how content is monetized. Relying solely on a single social media platform for monetization can be risky. Therefore, diversifying across multiple platforms can mitigate this risk. Further, another drawback of monetizing social media accounts is that it often requires a lot of time and effort. This includes the quality of content creation, negotiation with brands and staying updated on industry trends. Other drawbacks include measuring the value of the digital content, managing the right plan, managing contracts and invoices, measuring engagement, and managing loyalty.

Additionally, the role of 'bad actors' in the aforementioned context of social media continues to prevail. The bad actors captures or creates social media content pertaining to other users and subsequently sell it as counterfeit non-fungible tokens. This draws several issues related to proof of authenticity, verification, and value of the social media content. Further, the integral benefits of such non-fungible tokens are misused.

Hence, there is a need for an improved system and method for converting social media content to dynamic non-fungible tokens which addresses the aforementioned issue(s).

BRIEF DESCRIPTION

In accordance with an embodiment of the present disclosure, a computer-implemented system to convert social media content to dynamic non-fungible tokens is provided. The computer-implemented system includes a hardware processor and a memory coupled to the hardware processor. The memory comprises a set of program instructions in the form of a processing subsystem hosted on a server and configured to execute on a network to control bidirectional communications among a plurality of modules. The processing subsystem includes a user registration module configured to link one or more social media accounts pertaining to a first user with a corresponding user profile, upon successful registration of the first user. A content of the one or more social media accounts act as assets for the said first user. A value of each of the one or more social media accounts is determined based on engagement and control variable of a plurality of followers. The processing subsystem includes a contract generation module operatively coupled to the user registration module wherein the contract generation module is configured to utilize an e-signature tool to sign a contract and a proof of agreement between the said first user and a plurality of third-party applications via an application programming interface. The contract generation module is also configured to notarize the proof of agreement between the first user and the third-party applications automatically through a blockchain. Further, the processing subsystem includes a non-fungible token value creation module operatively coupled to the payment module wherein the non-fungible token value creation module is configured to convert a portion of the content to a plurality of non-fungible tokens dynamically. Furthermore, the processing subsystem includes a non-fungible token marketplace module operatively coupled to the non-fungible token value creation module wherein the non-fungible token marketplace module is configured to allow the first user to sell the non-fungible tokens and buy one or more non-fungible tokens from a second user. Moreover, the processing subsystem includes a payment module operatively coupled to the non-fungible token marketplace module and is affiliated to the third-party applications wherein the payment module is configured to allow the first user to monetize the assets by converting the content into one or more non-fungible tokens thereby converting a second user to a paid member based on a monthly subscription provided by the first user. The payment module is also configured to provide a total social net value of the content based on total number of likes, mentions, hashtags, followers, viewers, subscribers, score, and the likes obtained from one or more social network platforms supporting the one or more social media accounts of the first user. Further, the payment module is configured to generate a revenue through a transaction processing fees and one or more SaaS subscriptions wherein the revenue from the transaction processing fees is generated through sponsored posts and membership and revenue from the SaaS subscriptions are generated by the first user and the plurality of third-party applications. The processing subsystem includes a non-fungible token swapping module operatively coupled to the non-fungible token marketplace module wherein the non-fungible token swapping module is configured to allow the first user to swap type of currency of the one or more non-fungible token across multiple networks.

In accordance with an embodiment of the present disclosure, a computer-implemented method to convert social media content to dynamic non-fungible tokens is provided. The computer-implemented method includes linking, by a user registration module, linking one or more social media accounts pertaining to a first user with a corresponding user profile, upon successful registration of the first user. A content of the one or more social media accounts act as assets of the said first user. A value of each of the one or more social media accounts is determined based on engagement and control variable of a plurality of followers. The computer-implemented method includes utilizing, by a contract generation module, an e-signature tool to sign a contract and a proof of agreement between the said first user and a plurality of third-party applications via an application programming interface. The computer-implemented method includes notarizing, by the contract generation module, the proof of agreement between the first user and the third-party applications automatically through a blockchain. The computer-implemented method includes converting, by a non-fungible token value creation module, a portion of the content to a plurality of non-fungible tokens dynamically. The computer-implemented method includes allowing, by a non-fungible token marketplace module, first user to sell the non-fungible tokens and buy one or more non-fungible tokens from a second user. The computer-implemented method includes allowing, by a payment module, the first user to monetize the assets by converting the content into one or more non-fungible tokens thereby converting a second user to a paid member based on a monthly subscription provided by the first user. Further, the computer-implemented method includes providing, by the payment module, a total social net value of the content based on total number of likes, mentions, hashtags, followers, viewers, subscribers, score, and the likes obtained from one or more social network platforms supporting the one or more social media accounts of the first user. Furthermore, the computer-implemented method includes generating, by the payment module, a revenue through a transaction processing fees and one or more SaaS subscriptions wherein the revenue from the transaction processing fees is generated through sponsored posts and membership and revenue from the SaaS subscriptions are generated by the first user and the plurality of third-party applications. Moreover, the computer-implemented method includes allowing, by a non-fungible token swapping module, the first user to swap type of currency of the one or more non-fungible token across multiple networks.

In accordance with another embodiment of the present disclosure, a non-transitory computer-readable medium storing a computer program that, when executed by a processor, causes the processor to perform a computer-implemented method to convert social media content to dynamic non-fungible tokens is provided. The computer-implemented method includes linking, by a user registration module, linking one or more social media accounts pertaining to a first user with a corresponding user profile, upon successful registration of the first user. A content of the one or more social media accounts act as assets of the said first user. A value of each of the one or more social media accounts is determined based on engagement and control variable of a plurality of followers. The computer-implemented method includes utilizing, by a contract generation module, an e-signature tool to sign a contract and a proof of agreement between the said first user and a plurality of third-party applications via an application programming interface. The computer-implemented method includes notarizing, by the contract generation module, the proof of agreement between the first user and the third-party applications automatically through a blockchain. The computer-implemented method includes converting, by a non-fungible token value creation module, a portion of the content to a plurality of non-fungible tokens dynamically. The computer-implemented method includes allowing, by a non-fungible token marketplace module, first user to sell the non-fungible tokens and buy one or more non-fungible tokens from a second user. The computer-implemented method includes allowing, by a payment module, the first user to monetize the assets by converting the content into one or more non-fungible tokens thereby converting a second user to a paid member based on a monthly subscription provided by the first user. Further, the computer-implemented method includes providing, by the payment module, a total social net value of the content based on total number of likes, mentions, hashtags, followers, viewers, subscribers, score, and the likes obtained from one or more social network platforms supporting the one or more social media accounts of the first user. Furthermore, the computer-implemented method includes generating, by the payment module, a revenue through a transaction processing fees and one or more SaaS subscriptions wherein the revenue from the transaction processing fees is generated through sponsored posts and membership and revenue from the SaaS subscriptions are generated by the first user and the plurality of third-party applications. Moreover, the computer-implemented method includes allowing, by a non-fungible token swapping module, the first user to swap type of currency of the one or more non-fungible token across multiple networks.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 4*a* and FIG. 4*b* illustrates a flow chart representing the steps involved in a method for converting social media content to dynamic non-fungible tokens in accordance with an embodiment of the present disclosure.

Figure 1:
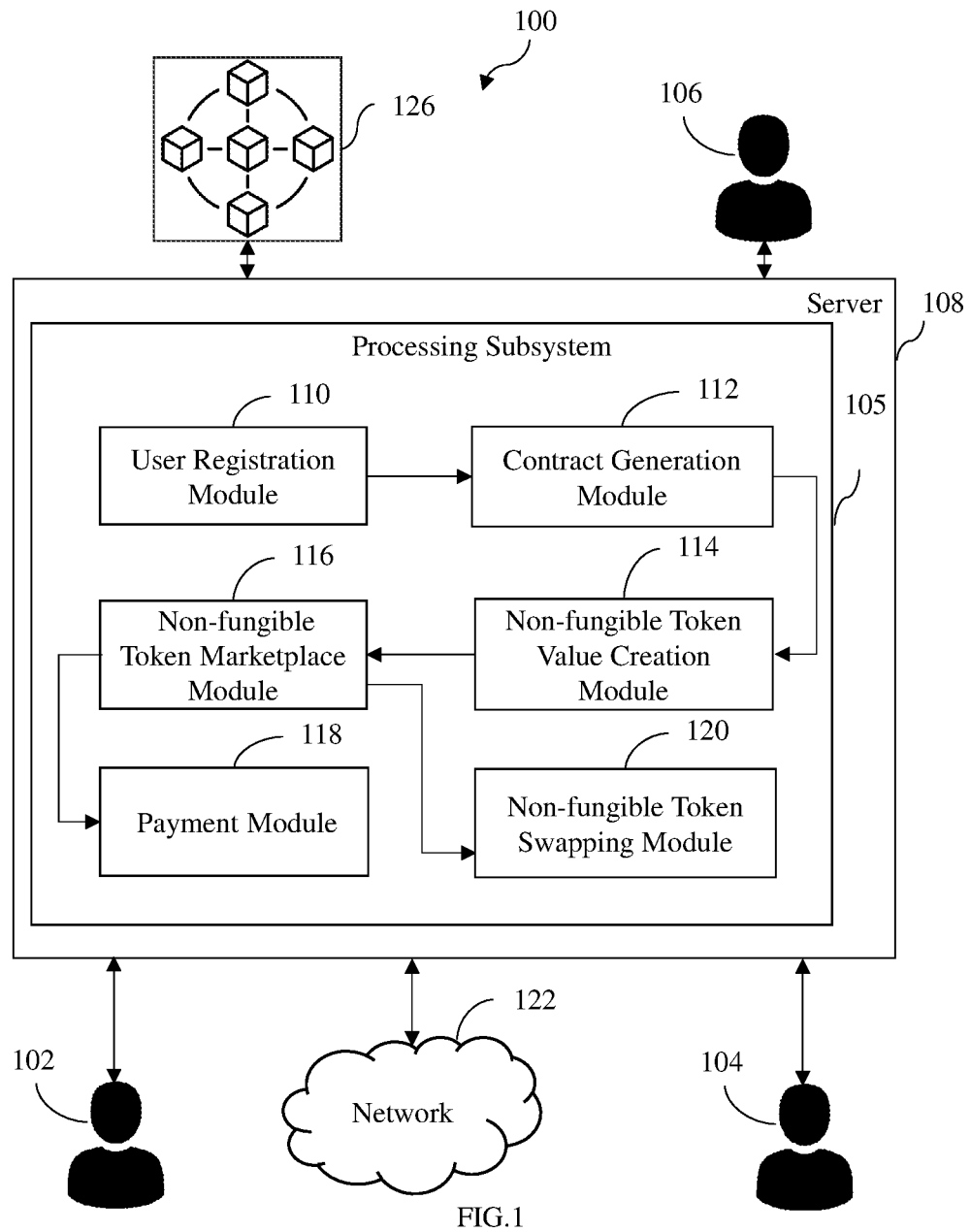
FIG. 1 is a block diagram representation of a computer-implemented system to convert social media content to dynamic non-fungible tokens in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated computer-implemented system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In the following discussion, references are made to three actors or user groups who participate in the computer-implemented system disclosed herein. The roles of the three actors may vary. Typically, the three actors are a first user, a second user and third party sources. The term 'first user' is defined as any person who is an influencer in an economy. The 'first user' is an actor who has applied and is approved to by an influencer. Further, the 'first user' is the person who interacts with the third party sources (also referred herein as 'brands'). Further, the term 'second user' is defined as any person who has not applied to become an 'influencer'. Further, the 'second user' can verify himself/herself by linking his/her social media accounts in the computer-implemented system disclosed herein. Further, the 'third party sources' are those who interact with the 'first user'. In other words, the 'third party sources' are brands who have upgraded their account brand membership.

Further, it must be noted that the first user, second user and the third party sources may be collectively referred to as 'actors' in the following discussion.

In accordance with an embodiment of the present disclosure, a computer-implemented system to convert social media content to dynamic non-fungible tokens is provided. The computer-implemented system includes a hardware processor and a memory coupled to the hardware processor. The memory comprises a set of program instructions in the form of a processing subsystem hosted on a server and configured to execute on a network to control bidirectional communications among a plurality of modules. The processing subsystem includes a user registration module configured to link one or more social media accounts pertaining to a first user with a corresponding user profile, upon successful registration of the first user. A content of the one or more social media accounts act as assets for the said first user. A value of each of the one or more social media accounts is determined based on engagement and control variable of a plurality of followers. The processing subsystem includes a contract generation module operatively coupled to the user registration module wherein the contract generation module is configured to utilize an e-signature tool to sign a contract and a proof of agreement between the said first user and a plurality of third-party applications via an application programming interface. The contract generation module is also configured to notarize the proof of agreement between the first user and the third-party applications automatically through a blockchain. Further, the processing subsystem includes a non-fungible token value creation module operatively coupled to the payment module wherein the non-fungible token value creation module is configured to convert a portion of the content to a plurality of non-fungible tokens dynamically. Furthermore, the processing subsystem includes a non-fungible token marketplace module operatively coupled to the non-fungible token value creation module wherein the non-fungible token marketplace module is configured to allow the first user to sell the non-fungible tokens and buy one or more non-fungible tokens from a second user. Moreover, the processing subsystem includes a payment module operatively coupled to the non-fungible token marketplace module and is affiliated to the third-party applications wherein the payment module is configured to allow the first user to monetize the assets by converting the content into one or more non-fungible tokens thereby converting a second user to a paid member based on a monthly subscription provided by the first user. The payment module is also configured to provide a total social net value of the content based on total number of likes, mentions, hashtags, followers, viewers, subscribers, score, and the likes obtained from one or more social network platforms supporting the one or more social media accounts of the first user. Further, the payment module is configured to generate a revenue through a transaction processing fees and one or more SaaS subscriptions wherein the revenue from the transaction processing fees is generated through sponsored posts and membership and revenue from the SaaS subscriptions are generated by the first user and the plurality of third-party applications. The processing subsystem includes a non-fungible token swapping module operatively coupled to the non-fungible token marketplace module wherein the non-fungible token swapping module is configured to allow the first user to swap type of currency of the one or more non-fungible token across multiple networks.

FIG. 1 is a block diagram representation of a computer-implemented system 100 to convert social media content to dynamic non-fungible tokens in accordance with an embodiment of the present disclosure. The computer-implemented system 100 includes a processing subsystem 105 hosted on a server 108. In one embodiment, the server 108 may include a cloud server. In another embodiment, the server 108 may include a local server. The processing subsystem 105 is configured to execute on a network 122 to control bidirectional communications among a plurality of modules. In one embodiment, the network 122 may include a wired network such as a local area network (LAN) or Wide Area Network (WAN), such as the Internet. In another embodiment, the network 122 may include both wired and wireless communications according to one or more standards and/or via one or more transport mediums. In one example, the network 122 may include wireless communications according to one of the 802.11 or Bluetooth specification sets, or another standard or proprietary wireless communication protocol. In yet another embodiment, the network 122 may also include communications over a terrestrial cellular network, including, a global system for mobile communications (GSM), code division multiple access (CDMA), and/or enhanced data for global evolution (EDGE) network.

The processing subsystem 105 includes a user registration module 110 to link one or more social media accounts pertaining to a first user 102 with a corresponding user profile, upon successful registration of the said first user 102. Typically, the actors are registered with the computer-implemented system 100 using an associated email address and phone number. In one embodiment, the actors can add, delete, or edit the links. The content of the one or more social media accounts act as assets for the said first user 102. A value of each of the one or more social media accounts is determined based on engagement and control variable of a plurality of followers. In one embodiment, a persona profile is generated from the one or more social media accounts of the said first user 102. Typically, the persona profile is created to aid in marketing. Additionally, in such an embodiment, an offline identity such as Know Your Customer (KYC) or Know Your Business (KYB) is established to understand customers or business from the persona profile.

It must be noted that the first user 102, a second user 104 and the third party sources 106 must register with the computer-implemented system 100 by creating an account. In one embodiment, a one-time password (OTP) is sent to a registered phone number to enable the first user 102, the second user 104 and the third party sources 106 to enter an email address and an associated password to login to the said computer-implemented system 100. Further, it must be noted that the account created is not based on username, mobile phone number, salutation, country, and email address.

Further, with regard to the first user 102 completing successful registration in the computer-implemented system 100, the first user 102 (also called as 'Influencer') is allowed to link one or more social media accounts to his/her user profile. The content of the one or more social media accounts acts as assets for the first user 102. Examples of the one or more social media accounts include, but is not limited to, Instagram, Spotify, SoundCloud, Facebook, Twitter, Snapchat, YouTube, TikTok and LinkedIn. In one embodiment, a list of the linked social media accounts is displayed. Further, a 'value' is determined for each of the linked social media account. Typically, the value is based on the number of 'likes', 'followers', 'growth', 'hashtags', 'viewers', 'subscribers' and 'score'. It must be noted that the said value may vary according to the social media account. Further, in one embodiment, the details of the linked social media account is shown as a visual representation, such as graphs.

Furthermore, with regard to the second user 104 completing successful registration in the computer-implemented system 100, the second user 104 (also called as 'Follower'), is allowed to upgrade his/her account and thereby switch into a 'premium influencer'. In other words, the second user 104 is typically a user who has not linked to his/her social media accounts. However, after the registration, the second user 104 is allowed to link to one or more associated social media accounts.

The user profile is generated upon successful registration. The user profile displays account details, settings of the user profile and legal details. Specifically, the settings includes a wallet setting that displays a plurality of wallets to the first user 102. The wallet is available to all the three actors of the computer-implemented system 100. Further, the balance in the plurality of wallets is displayed via a grid that includes a wallet history for instance, date, transaction ID, amount, requested amount and status. The status may be one of cancelled, denied, withdrew, and requested.

Additionally, the user profile includes a profile photo that is selected from the linked social media accounts. In one embodiment, if the first user 102 has not yet linked to at least one of the social media accounts then, the profile photo is displayed as an avatar icon. In another embodiment, if the first user 102 has linked to at least one of the social media accounts then, the profile photo is taken from the said at least one of the linked social media accounts. In such an embodiment, the profile photo is taken from the at least one of the linked social media accounts based on priority. For instance, consider that the first user 102 has linked his/her Facebook, Instagram, and Twitter accounts. The priority can be Instagram, Facebook, and Twitter accounts. In another embodiment, the profile photo can be updated based on an order of linking the social media accounts.

Additionally, the user profile enables the first user 102 to invite friends and return back to a home page. The 'friends' are defined as potential users of the computer-implemented system 100. Further, the 'friends' are located at multiple geographical locations. The invitation can be sent via email or phone. In one embodiment, the first user 102 may display and edit his/her user profile. In another embodiment, the user profile also displays wallet settings and points. Typically, a wallet allows a user to send, receive and spend digital money. Examples of the wallet includes, MetaMask, Coinbase, TrustWallet, WalletConnect, MoonPay and BitPay. The points can be either 'private' or 'public'. Each actor will be able to view his/her private points on their corresponding profile page. Examples of the points includes, but is not limited to, bought points, earned points, favor points, locked points and unlocked points.

Further, the first user 102, the second user 104 and the plurality of third party sources 106 are entitled to a membership scheme, upon successful registration. The membership scheme includes free membership, premium membership, brand membership and lifetime membership.

The processing subsystem 105 includes a contract generation module 112 operatively coupled to the user registration module 110. The contract generation module 112 is configured to utilize an e-signature tool to sign a contract and a proof of agreement between the said first user 102 and the plurality of third party sources 106 via an application programming interface. In one embodiment, the e-signature tool is Docusign API. In one embodiment, the contract and the proof of agreement is converted into a non-fungible token encrypted dynamically through a blockchain 126 (available worldwide). Examples of the blockchain 126 includes, but is not limited to, Etherium, Polygon, Binance Coin (BNB) and Medic. Further, the contract generation module 112 is configured to notarize the proof of agreement between the first user 102 and the third party sources 106 automatically through the blockchain 126 along with corresponding date and time. Further, it will be appreciated to those skilled in the art that non-fungible tokens may pertain to artwork, event tickets, video game items, music, collectibles or trading cards, sports, domain names, memes, virtual real estate, virtual fashion and the like.

The processing subsystem 105 includes a non-fungible token value creation module 114 operatively coupled to the contract generation module 112. The non-fungible token value creation module 114 is configured to convert a portion of the content to a plurality of non-fungible tokens dynamically. In one embodiment, the non-fungible token value creation module 114 is configured to assign a value of one or more non-fungible tokens wherein the value is a measure of a weightage of a plurality of engagements on the content. Examples of the plurality of engagements includes, but is not limited to, like, share and comments on the corresponding content. Further, in another embodiment, the non-fungible token value creation module 114 is configured to change the value assigned dynamically based on one or more factors, wherein the one of more factors comprises credibility, popularity, and reputation.

In one embodiment, the first user 102 can burn one or more NFT's. Typically, burning the NFT means to destroy the NFT. The contract checks to see that the first user 102 has a gas fees in his/her wallet and verifies the number of NFT's to be burned. If the currency is insufficient to cover the gas fee, then the transaction is invalidated and the NFT does not get burned. Alternatively, if the required gas fee is available in the wallet, then the first user 102 must sign the contract approving the transaction before the NFT is destroyed forever. The NFT burning is a public, irreversible, and permanent transaction on the blockchain ledger (128, FIG. 2). The blockchain 126 records this transaction and the NFT is deemed no longer available.

The processing subsystem 105 includes a non-fungible token marketplace module 116 operatively coupled to the non-fungible token value creation module 114. The non-fungible token marketplace module 116 displays a list of non-fungible tokens (NFT) to the first user 102 and/or the second user 104. The non-fungible token marketplace module 116 is configured to allow the first user 102 to sell the non-fungible tokens and buy one or more non-fungible tokens from a second user 104. It must be noted that the first user 102 owns the content and sells a portion of the said content to the second user 104. The second user 104 is an end user, for example a person in the content, brand and an investor who has helped the first user 102 in the process of converting and valuing the said content. In one embodiment, the second user 102 may also buy additions of the non-fungible token that he/she purchases. Typically, the NFT's can be purchased with crypto currency from a wallet, with a Fiat amount (when the crypto currency is not sufficient) and by making an offer. In one embodiment, the non-fungible token marketplace module 116 is configured to perform the below activities:

1. Allow the actor to buy one or more non-fungible tokens pertaining to other users.
2. Allow the first user 102 to add non-fungible tokens to a category of favorites.
3. Allow the first user 102 to display the one or more non-fungible tokens in a marketplace. The NFT's will be listed as cards. When clicked, details of the NFT is displayed. This includes NFT's title, description of NFT, price of NFT and the number of likes.
4. Allow the first user 102 to view a plurality of linked social media accounts and select a content of another user to convert the said content to a corresponding non-fungible token.
5. Allow the actor (second user 104 and the third party sources 106) to mint the content of a desired linked social media account into a corresponding non-fungible token—The minting can occur through two options. The first option allows the said actor to select a social post from the list and subsequently initiate a minting process. Alternatively, the second option allows the actor to initiate the minting process and then subsequently upload a file of the social post.
6. Allow the first user 102 to search for a non-fungible token in the marketplace.

Referring back to the minting process defined in point 5, there are three options for setting a price for an NFT. The three options are 'fixed price', 'timed auction' and 'unlimited auction'. The fixed price option allows the actor to fix a price that is affordable to buy. Further, the timed auction allows the actor to set a precise starting and ending time for an auction along with an affordable price. Likewise, the unlimited auction allows the actor to accept the offer at any desired time. This allows the actor to continue bidding for the NFT until it is purchased.

Further to the minting process, the actor (the second user 104 and the third party sources 106) creates a collection. It must be noted that for minting NFT's, there has to be at least one collection. In other words, without a collection, the actor cannot mint NFT's.

Further, the non-fungible token marketplace module 116 displays a plurality of metrics, for instance, total amount of 'items', total amount of 'buyers' and total volume.

The processing subsystem 105 includes a payment module 118 operatively coupled to the non-fungible token marketplace module 116. Typically, the payment module 118 is affiliated to the third party sources 106. The payment module 118 is configured to allow the first user 102 to monetize the assets and convert the content into one or more non-fungible tokens thereby converting a second user 104 to a paid member based on a monthly subscription provided by the first user 102.

Further, the payment module 118 is configured to provide a total social net value of the content based on total number of likes, mentions, hashtags, followers, viewers, subscribers, score, and the likes obtained from one or more social network platforms supporting the one or more social media accounts of the first user 102.

Additionally, the payment module 118 is configured to generate a revenue through a transaction processing fees and one or more SaaS subscriptions wherein the revenue from the transaction processing fees is generated through sponsored posts and membership and revenue from the SaaS subscriptions are generated by the first user 102 and the plurality of third party sources 106.

In one embodiment, the payment module 118 is configured to monetize and convert content of the first user 102 into at least one of a corresponding copyright and digital asset as one or more non-fungible tokens thereby converting the second user 104 to a paid member based on a monthly subscription provided by the first user 102. In one embodiment, the terms of agreement for copyrights are created.

The processing subsystem 105 includes a non-fungible token swapping module 120 operatively coupled to the non-fungible token marketplace module 116. The non-fungible token swapping module 120 is configured to allow the actors to swap type of currency of the one or more non-fungible token across multiple networks. It must be noted that network compliance is ensured. Further, as the crypto currencies vary across geographical boundaries, a new amount for the NFT is displayed.

In one embodiment, the various functional components of the computer-implemented system may reside on a single computer, or they may be distributed across several computers in various arrangements. The various components of the computer-implemented system may, furthermore, access one or more databases, and each of the various components of the computer-implemented system may be in communication with one another. Further, while the components of FIG. 1 are discussed in the singular sense, it will be appreciated that in other embodiments multiple instances of the components may be employed.

Figure 2:
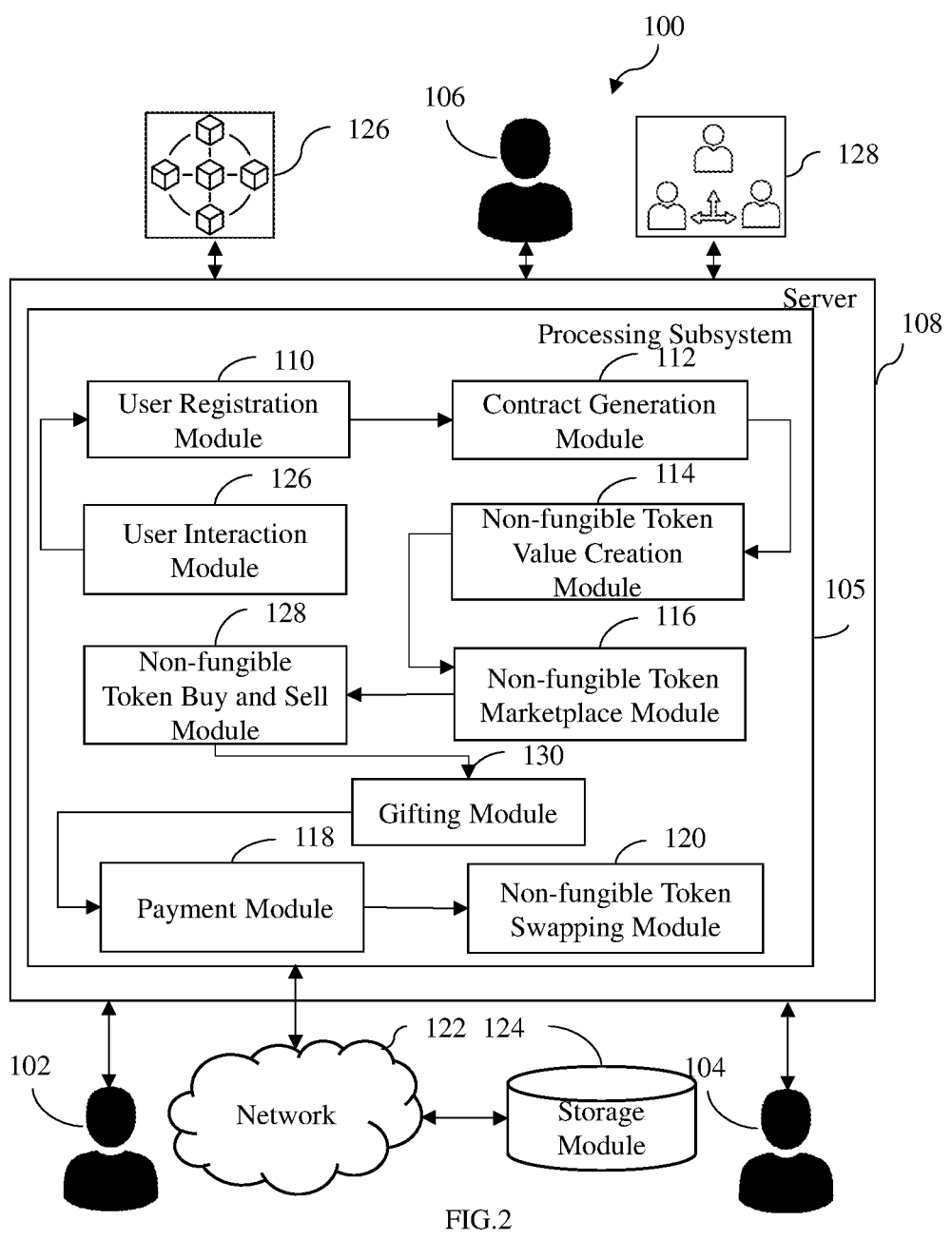
FIG. 2 is a schematic representation of an exemplary embodiment of the computer-implemented system to convert social media content to dynamic non-fungible tokens of FIG. 1 in accordance with an embodiment of the present disclosure.

FIG. 2 is a schematic representation of an exemplary embodiment of a computer-implemented system 100 to convert social media content to dynamic non-fungible tokens of FIG. 1 in accordance with an embodiment of the present disclosure. The computer-implemented system 100 of FIG. 1 includes the user registration module 110, the contract generation module 112, the non-fungible token value creation module 114, the non-fungible token marketplace module 116, the payment module 118 and the non-fungible token swapping module 120. In one embodiment, the processing subsystem 105 includes a user interaction module 126 operatively coupled to the user registration module 110. The user interaction module 126 is configured to enable interaction between the first user 102 and the plurality of third party sources 106. Further, the user interaction module 126 facilitates the first user 102 to start a live chat session. In one embodiment, the chat session can be a concert chat or through a link. The number of participants for the chat can be determined by the first user 102. Additionally, a price may be set for joining the chat session. Upon completion of the chat session, a corresponding summary is displayed.

Further, the processing subsystem 105 includes a non-fungible token buy and sell module 128 operatively coupled to the non-fungible token marketplace module 116. The non-fungible token buy and sell module 128 is configured to offer buying and selling of a plurality of non-fungible tokens. In one embodiment, the non-fungible token buy and sell module 128 is configured to trade a non-fungible token between the actors. In one embodiment, if an NFT with royalty is traded then, it is displayed as a royalty trade icon via a user interface configured on a user device.

Furthermore, the processing subsystem 105 includes a gifting module 130 operatively coupled to the non-fungible token buy and sell module 128. The gifting module 130 is configured to allow the first user 102 to receive a gift and give a gift to other users of the computer-implemented system. It must be noted that a wallet address is required to receive an NFT gift. Further, a blockchain transfer is not reversible and hence care must be taken to type the wallet address correctly. Additionally, the gifting module 130 is configured to allow the first user 102 to offer earnings upon monetizing the content to charity.

Moreover, the processing subsystem 105 includes a storage module 124 operatively coupled to the payment module 118. The storage module 124 is configured to store a relationship pertaining to the contract between the first user 102 and the plurality of third party sources 106. Additionally, the storage module 124 is configured to provide a public ledger 128 to store the said relationship in the blockchain 126. The public ledger 128 is configured to generate an invoice of a transaction comprising pricing, status of payment, received payment, royalty for copyright agreement cost, a transaction status, order taken, order accepted, order schedule, order filled, and order minted into the one or more non-fungible tokens. In one embodiment, the storage module 124 is configured to store the content of the one or more social media accounts of the user and the transaction details.

Considering a non-limiting example in which a plurality of users registers into the computer-implemented system 100 via their respective user devices. Examples of the user device include, but is not limited to, a mobile phone, desktop computer, portable digital assistant (PDA), smart phone, tablet, ultra-book, netbook, laptop, multi-processor system, microprocessor-based or programmable consumer electronic system, or any other communication device that a user may use. In some embodiments, the computer-implemented system may comprise a display module (not shown) to display information (for example, in the form of user interfaces). In further embodiments, the computer-implemented system may comprise one or more of touch screens, accelerometers, gyroscopes, cameras, microphones, global positioning system (GPS) devices, and so forth. Further, examples of the web browser includes, but is not limited to, Microsoft Edge, Internet Explorer, Google Chrome, Mozilla Firefox, and Apple Safari.

Typically, the registration is performed by using email addresses and phone numbers. Upon successful registration, the plurality of users become the first user 102, the second user 104 and the third party sources 106. Consider the first user 102 as 'X', the second user 104 as 'Y' and the third party sources 106 as 'Z'. X links at least one of his/her social media accounts to become an influencer. Subsequently, the total number of followers of the linked social media accounts are displayed. The contents of the linked social media accounts are also displayed and an icon besides the contents defines whether or not the content is converted into a corresponding NFT. Further, other statics and metrics are displayed. For instance, public (total likes, shares, and comments), private (status, ranking, voice score, net worth, and frequency), frequency and followers. Now, the content of the social media accounts of X is converted into corresponding NFT's and stored in a blockchain. Y and Z can now view and buy the NFT's in a marketplace. The NFT's are displayed as cards. Upon clicking a particular card, a detail page is displayed. Y and Z can now choose to mint one or more NFT's. Subsequently, a wallet page is displayed. Y and Z can use the wallet to pay for the one or more NFT's purchased. Further, a NFT can be traded between X, Y and Z. In another case, a NFT can be gifted between X, Y and Z. In yet another case, a NFT can be swapped between any two of the users.

Figure 3:
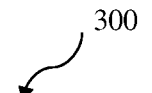
FIG. 3 is a block diagram of a computer or a server in accordance with an embodiment of the present disclosure.
Figure 3:
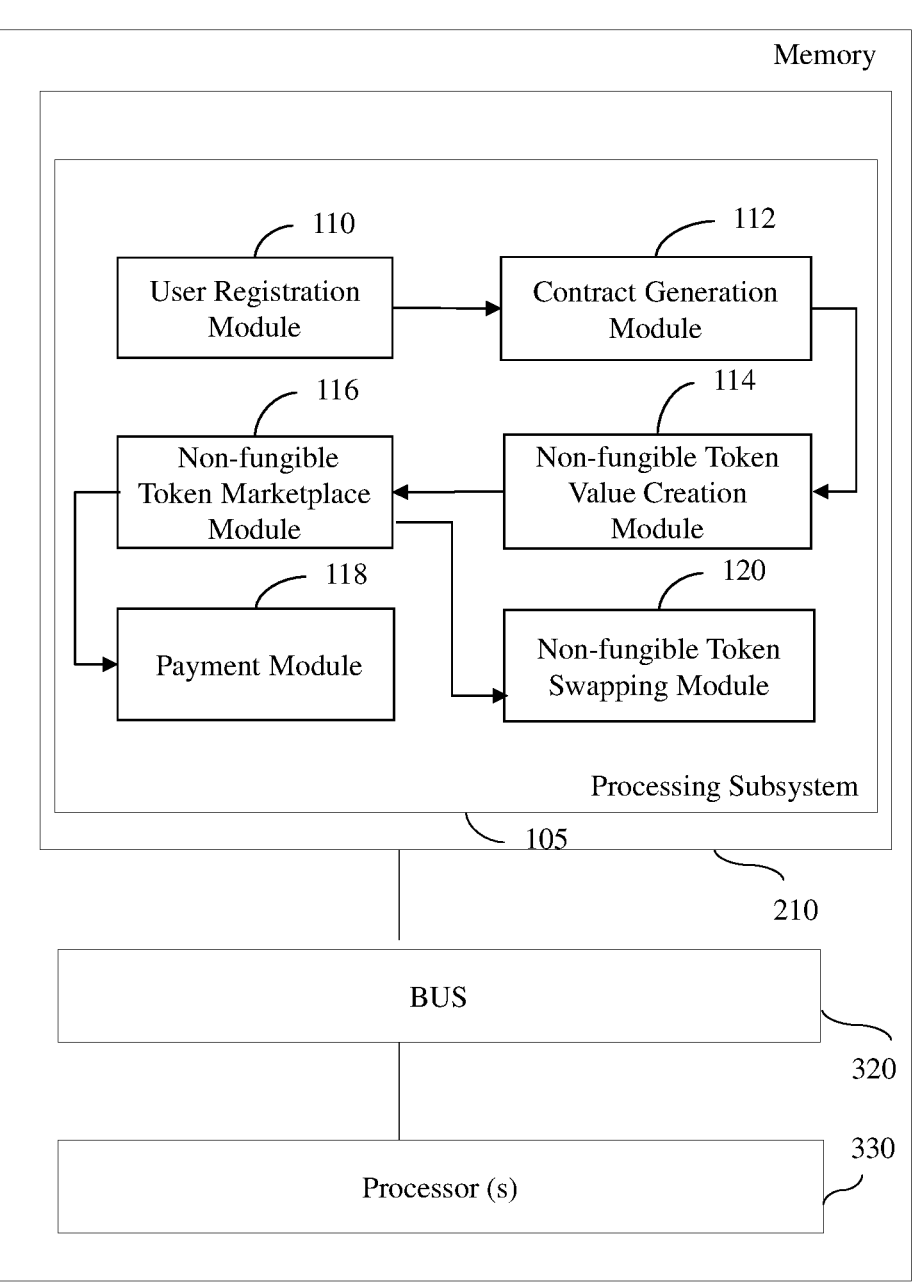

FIG. 3 is a block diagram of a computer or a server in accordance with an embodiment of the present disclosure. The server 108 includes processor(s) 330, and memory 310 operatively coupled to the bus 320. The processor(s) 330, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 310 includes several subsystems stored in the form of computer-readable medium which instructs the processor to perform the method steps illustrated in FIG. 1. The memory 310 includes several subsystems stored in the form of executable program which instructs the processor 330 to perform the method steps illustrated in FIG. 1. The memory 310 includes a processing subsystem 105 of FIG. 1. The processing subsystem 105 further has following modules: a user registration module 110, a contract generation module 112, a non-fungible token value creation module 114, a non-fungible token marketplace module 116, a payment module 118 and a non-fungible token swapping module 120.

In accordance with an embodiment of the present disclosure, a computer-implemented system to convert social media content to dynamic non-fungible tokens is provided. The computer-implemented system includes a processing subsystem hosted on a server. The processing subsystem is configured to execute on a network to control bidirectional communications among a plurality of modules. The processing subsystem includes a user registration module configured to link one or more social media accounts pertaining to a first user 102 with a corresponding user profile, upon successful registration of the first user 102. A content of the one or more social media accounts act as assets for the said first user 102. A value of each of the one or more social media accounts is determined based on engagement and control variable of a plurality of followers. The processing subsystem includes a contract generation module operatively coupled to the user registration module wherein the contract generation module is configured to utilize an e-signature tool to sign a contract and a proof of agreement between the said first user 102 and a plurality of third-party applications via an application programming interface. The contract generation module is also configured to notarize the proof of agreement between the first user 102 and the third-party applications automatically through a blockchain 126. Further, the processing subsystem includes a non-fungible token value creation module operatively coupled to the payment module wherein the non-fungible token value creation module is configured to convert a portion of the content to a plurality of non-fungible tokens dynamically. Furthermore, the processing subsystem includes a non-fungible token marketplace module operatively coupled to the non-fungible token value creation module wherein the non-fungible token marketplace module is configured to allow the first user 102 to sell the non-fungible tokens and buy one or more non-fungible tokens from a second user 104. Moreover, the processing subsystem includes a payment module operatively coupled to the non-fungible token marketplace module and is affiliated to the third-party applications wherein the payment module is configured to allow the first user 102 to monetize the assets by converting the content into one or more non-fungible tokens thereby converting a second user 104 to a paid member based on a monthly subscription provided by the first user 102. The payment module is also configured to provide a total social net value of the content based on total number of likes, mentions, hashtags, followers, viewers, subscribers, score, and the likes obtained from one or more social network platforms supporting the one or more social media accounts of the first user 102. Further, the payment module is configured to generate a revenue through a transaction processing fees and one or more SaaS subscriptions wherein the revenue from the transaction processing fees is generated through sponsored posts and membership and revenue from the SaaS subscriptions are generated by the first user 102 and the plurality of third-party applications. The processing subsystem includes a non-fungible token swapping module operatively coupled to the non-fungible token marketplace module wherein the non-fungible token swapping module is configured to allow the first user 102 to swap type of currency of the one or more non-fungible token across multiple networks.

While computer-readable medium is shown in an example embodiment to be a single medium, the term "computer-readable medium" should be taken to include a single medium or multiple media (for example, a centralized or distributed database, or associated caches and servers) able to store the instructions. The term "computer readable medium" shall also be taken to include any medium that is capable of storing instructions for execution by the machine and that cause the machine to perform any one or more of the methodologies disclosed herein. The term "computer-readable medium" includes, but not to be limited to, data repositories in the form of solid-state memories, optical media, and magnetic media.

The bus (220) as used herein refers to be internal memory channels or computer network that is used to connect computer components and transfer data between them. The bus (220) includes a serial bus or a parallel bus, wherein the serial bus transmits data in bit-serial format and the parallel bus transmits data across multiple wires. The bus (220) as used herein may include but not limited to, a system bus, an internal bus, an external bus, an expansion bus, a frontside bus, a backside bus, and the like.

Figure 4A:
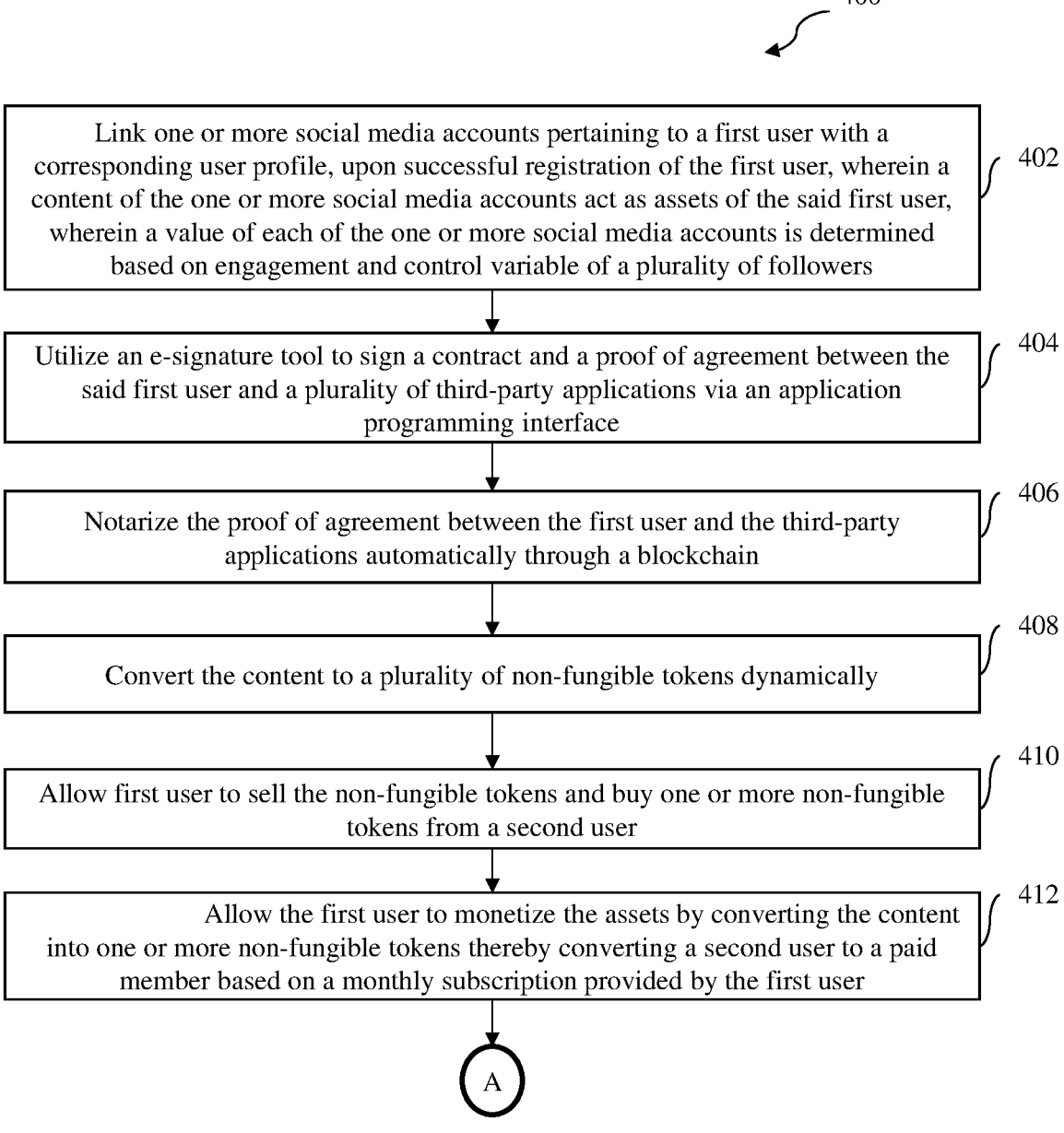

FIG. 4a and FIG. 4b illustrates a flow chart representing the steps involved in a method 400 for converting social media content to dynamic non-fungible tokens in accordance with an embodiment of the present disclosure. The method 400 occurs between a plurality of actors namely, a first user, a second user and third party sources 106 (herein referred to as 'brands'). The method 400 begins at step 402.

At step 402, the method 400 includes linking, by a user registration module, one or more social media accounts pertaining to a first user with a corresponding user profile. A content of the one or more social media accounts act as assets of the said first user, wherein a value of each of the one or more social media accounts is determined based on engagement and control variable of a plurality of followers. The engagement includes like, share and comments on the corresponding content.

In one embodiment, the first user is allowed to invite one or more friends located at multiple geographical locations as potential users of the computer-implemented system, upon successful registration.

In another embodiment, the method 400 includes enabling, by a user interaction module, interaction between the first user and the plurality of third party sources.

In yet another embodiment, the method 400 includes to create a profile page corresponding to the user, wherein the profile page displays an account details of the user, settings of the profile page and legal details. The settings of the profile page includes a wallet setting wherein a plurality of wallets are displayed to the user for selection.

At step 404, the method 400 includes utilizing, by a contract generation module, an e-signature tool to sign a contract and a proof of agreement between the said first user and the plurality of third party sources via an application programming interface. In one embodiment, the contract and the proof of agreement is converted into a non-fungible token encrypted dynamically through the blockchain.

At step 406, the method 400 includes notarizing, by the contract generation module, the proof of agreement between the first user and the third party sources automatically through a blockchain.

At step 408, the method 400 includes converting, by a non-fungible token value creation module, the content to non-fungible tokens dynamically. Further, the method 400 includes assigning a value of one or more non-fungible tokens wherein the value is a measure of a weightage of a plurality of engagements on the content. Furthermore, the method 400 includes changing the value assigned dynamically based on one or more factors, wherein the one of more factors comprises credibility, popularity, and reputation.

At step 410, the method 400 includes allowing, by a non-fungible token marketplace module, first user to sell the non-fungible tokens and buy one or more non-fungible tokens from a second user. The method 400 also includes allowing the first user to add non-fungible tokens to a category of favorites, allowing the first user to display the one or more non-fungible tokens in a marketplace, allowing the first user to view a plurality of linked social media accounts and select a content of another user to convert the said content to a corresponding non-fungible token and allowing the first user to search for a non-fungible token in the marketplace. Further, the method 400 includes allowing the second user and the third party sources to mint the content into a corresponding non-fungible token. The minting can occur in two ways, namely by selecting a social post from a list and subsequently initiating a process to mint. Alternatively, the minting can occur by first initiating the minting process and then uploading a file.

In one embodiment, the method 400 includes to offering, by a non-fungible token buy and sell module, buying and selling of a plurality of non-fungible tokens. In another embodiment, the method 400 includes trading, by the non-fungible token buy and sell module, a non-fungible token between the first user, the second user and the third-party sources.

Further, in one embodiment, the method 400 includes allowing, by a gifting module, the first user to receive a gift and give a gift to other users of the computer-implemented system. The method 400 also includes allowing, by the gifting module, the first user to offer earnings upon monetizing the content to charity.

At step 412, the method 400 includes allowing, by a payment module, the first user to monetize the assets by converting the content into one or more non-fungible tokens thereby converting a second user to a paid member based on a monthly subscription provided by the first user.

In one embodiment, the method 400 includes monetizing and converting a portion of the content of the first user into at least one of a corresponding copyright and digital asset as one or more non-fungible tokens thereby converting the second user to a paid member based on a monthly subscription provided by the first user.

At step 414, the method 400 includes providing, by a payment module, a total social net value of the content based on total number of likes, mentions, hashtags, followers, viewers, subscribers, score, and the likes obtained from one or more social network platforms supporting the one or more social media accounts of the first user.

At step 416, the method 400 includes generating, by a payment module, a revenue through a transaction processing fees and one or more SaaS subscriptions wherein the revenue from the transaction processing fees is generated through sponsored posts and membership and revenue from the SaaS subscriptions are generated by the first user and the plurality of third party sources.

In one embodiment, the method 400 includes storing, by a storage module, a relationship pertaining to the contract between the first user and the plurality of third party sources. In one embodiment, the one or more social media accounts of the user and transaction details are also stored. Further, the method 400 includes providing a public ledger to store the said relationship in the blockchain. The public ledger is configured to generate an invoice of a transaction comprising pricing, status of payment, received payment, royalty for copyright agreement cost, a transaction status, order taken, order accepted, order schedule, order filled, and order minted into the one or more non-fungible tokens.

At step 418, the method 400 includes allowing, by a non-fungible token swapping module, the first user to swap type of currency of the one or more non-fungible token across multiple networks.

The method 400 ends at step 418.

Various embodiments of the computer-implemented system and method converting social media content to non-fungible tokens provides several benefits. One such benefit is that the influencer contract generation module enable an efficient process of signing a contract and notarizing the said contract. Further, the feature of the NFT marketplace module enables that the computer-implemented system is compliant with geographic boundaries. Further, the conversion of the social media content into non-fungible tokens by the non-fungible token value creation module allows the user to monetize, manage, market and mint the social media content. Additionally, the NFT marketplace module ensures authenticity, verification and value of the social media content thereby reducing the role of 'bad actors' significantly in the market.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A computer-implemented system to convert social media content to dynamic non-fungible tokens comprising:
    a hardware processor; and
    a memory coupled to the hardware processor, wherein the memory comprises a set of program instructions in the form of a processing subsystem, configured to be executed by the hardware processor, wherein the processing subsystem hosted on a server and configured to execute on a network to control bidirectional communications among a plurality of modules comprising:

a user registration module configured to link one or more social media accounts pertaining to a first user with a corresponding user profile, upon successful registration of the first user, wherein a content of the one or more social media accounts act as assets for the said first user;

wherein a value of each of the one or more social media accounts is determined based on engagement and control variable of a plurality of followers;

a contract generation module operatively coupled to the user registration module wherein the contract generation module is configured to:

utilize an e-signature tool to sign a contract and a proof of agreement between the said first user and a plurality of third party sources via an application programming interface; and notarize the proof of agreement between the first user and the third party sources automatically through a blockchain;

a non-fungible token value creation module operatively coupled to the payment module wherein the non-fungible token value creation module is configured to convert a portion of the content to a plurality of non-fungible tokens dynamically;

a non-fungible token marketplace module operatively coupled to the non-fungible token value creation module wherein the non-fungible token marketplace module is configured to allow the first user to sell the non-fungible tokens and buy one or more non-fungible tokens from a second user;

a payment module operatively coupled to the non-fungible token marketplace module and is affiliated to the third party sources wherein the payment module is configured to:

allow the first user to monetize the assets by converting the content into one or more non-fungible tokens thereby converting a second user to a paid member based on a monthly subscription provided by the first user; and provide a total social net value of the content based on total number of likes, mentions, hashtags, followers, viewers, subscribers, score, and the likes obtained from one or more social network platforms supporting the one or more social media accounts of the first user; and generate a revenue through a transaction processing fees and one or more SaaS subscriptions wherein the revenue from the transaction processing fees is generated through sponsored posts and membership and revenue from the SaaS subscriptions are generated by the first user and the plurality of third party sources;

a non-fungible token swapping module operatively coupled to the non-fungible token marketplace module wherein the non-fungible token swapping module is configured to allow the first user to swap type of currency of the one or more non-fungible token across multiple networks.

2. The computer-implemented system of claim 1, wherein the contract and the proof of agreement is converted into a non-fungible token encrypted dynamically through the blockchain.

3. The computer-implemented system of claim 1, wherein the payment module is configured to monetize and convert content of the first user into at least one of a corresponding copyright and digital asset as one or more non-fungible tokens thereby converting the second user to a paid member based on a monthly subscription provided by the first user.

4. The computer-implemented system of claim 1, further comprising a storage module operatively coupled to the payment module wherein the storage module is configured to:

store a relationship pertaining to the contract between the first user and the plurality of third party sources; and provide a public ledger to store the said relationship in the blockchain.

5. The computer-implemented system of claim 4 wherein the public ledger is configured to generate an invoice of a transaction comprising pricing, status of payment, received payment, royalty for copyright agreement cost, a transaction status, order taken, order accepted, order schedule, order filled, and order minted into the one or more non-fungible tokens.

6. The computer-implemented system of claim 1, further comprising a user interaction module operatively coupled to user registration module wherein the user interaction module is configured to enable interaction between the first user and the plurality of third party sources.

7. The computer-implemented system of claim 1, further comprising a non-fungible token buy and sell module operatively coupled to the non-fungible token marketplace module wherein the non-fungible token buy and sell module is configured to offer buying and selling of a plurality of non-fungible tokens.

8. The computer-implemented system of claim 7, wherein the non-fungible token buy and sell module is configured to trade a non-fungible token between the first user, the second user and the third-party sources.

9. The computer-implemented system of claim 1, further comprising a gifting module operatively coupled with the non-fungible buy and sell module wherein the gifting module is configured to:

allow the first user to receive a gift and give a gift to other users of the system; and allow the first user to offer earnings upon monetizing the content to charity.

10. The computer-implemented system of claim 1, further comprising a non-fungible token marketplace module operatively coupled to the non-fungible token value creation module wherein the non-fungible token marketplace module is configured to:

allow the first user to buy one or more non-fungible tokens pertaining to other users;

allow the first user to add non-fungible tokens to a category of favorites;

allow the first user to display the one or more non-fungible tokens in a marketplace;

allow the first user to view a plurality of linked social media accounts and select a content of another user to convert the said content to a corresponding non-fungible token;

allow the second user and the third party sources to mint the content into a corresponding non-fungible token; and allow the first user to search for a non-fungible token in the marketplace.

11. The computer-implemented system of claim 10, wherein the second user and the third party sources are allowed to mint by at least one of selecting a social post from a list and subsequently initiate to mint and initiate to mint and subsequently upload a file.

12. The computer-implemented system of claim 1, wherein the non-fungible token value creation module is configured to:

assign a value of one or more non-fungible tokens wherein the value is a measure of a weightage of a plurality of engagements on the content; and change the value assigned dynamically based on one or more factors, wherein the one of more factors comprises credibility, popularity, and reputation.

13. The computer-implemented system of claim 1, wherein the plurality of engagements comprises like, share and comments on the corresponding content.

14. The computer-implemented system of claim 1, wherein the storage module is configured to store the content of the one or more social media accounts of the user and the transaction details.

15. The computer-implemented system of claim 1, wherein the first user is approved to be an influencer, the second user is a follower, and the third party sources pertains to associated brands.

16. The computer-implemented system of claim 1, wherein the first user is allowed to invite one or more friends located at multiple geographical locations as potential users of the system, upon successful registration.

17. The computer-implemented system of claim 1, wherein the user registration module is configured to create a profile page corresponding to the user, wherein the profile page displays an account details of the user, settings of the profile page and legal details.

18. The computer-implemented system of claim 17, wherein the settings of the profile page comprises a wallet setting wherein a plurality of wallets are displayed to the user for selection.

19. A computer-implemented method to convert social media content to dynamic non-fungible tokens comprising:

linking, by a user registration module, link one or more social media accounts pertaining to a first user with a corresponding user profile, upon successful registration of the first user, wherein a content of the one or more social media accounts act as assets of the said first user;

wherein a value of each of the one or more social media accounts is determined based on engagement and control variable of a plurality of followers;

utilizing, by a contract generation module, an e-signature tool to sign a contract and a proof of agreement between the said first user and a plurality of third party sources via an application programming interface;

notarizing, by the contract generation module, the proof of agreement between the first user and the third party sources automatically through a blockchain;

converting, by a non-fungible token value creation module, a portion of the content to a plurality of non-fungible tokens dynamically;

allowing, by a non-fungible token marketplace module, first user to sell the non-fungible tokens and buy one or more non-fungible tokens from a second user;

allowing, by a payment module, the first user to monetize the assets by converting the content into one or more non-fungible tokens thereby converting a second user to a paid member based on a monthly subscription provided by the first user;

providing, by the payment module, a total social net value of the content based on total number of likes, mentions, hashtags, followers, viewers, subscribers, score, and the likes obtained from one or more social network platforms supporting the one or more social media accounts of the first user;

generating, by the payment module, a revenue through a transaction processing fees and one or more SaaS subscriptions wherein the revenue from the transaction processing fees is generated through sponsored posts and membership and revenue from the SaaS subscriptions are generated by the first user and the plurality of third party sources; and allowing, by a non-fungible token swapping module, the first user to swap type of currency of the one or more non-fungible token across multiple networks.

20. A non-transitory computer-readable medium storing a computer program that, when executed by a processor, causes the processor to perform a computer-implemented method to convert social media content to dynamic non-fungible tokens, wherein the computer-implemented method comprises:

linking, by a user registration module, link one or more social media accounts pertaining to a first user with a corresponding user profile, upon successful registration of the first user, wherein a content of the one or more social media accounts act as assets of the said first user;

wherein a value of each of the one or more social media accounts is determined based on engagement and control variable of a plurality of followers;

utilizing, by a contract generation module, an e-signature tool to sign a contract and a proof of agreement between the said first user and a plurality of third party sources via an application programming interface;

notarizing, by the contract generation module, the proof of agreement between the first user and the third party sources automatically through a blockchain;

converting, by a non-fungible token value creation module, a portion of the content to a plurality of non-fungible tokens dynamically;

allowing, by a non-fungible token marketplace module, first user to sell the non-fungible tokens and buy one or more non-fungible tokens from a second user;

allowing, by a payment module, the first user to monetize the assets by converting the content into one or more non-fungible tokens thereby converting a second user to a paid member based on a monthly subscription provided by the first user;

providing, by the payment module, a total social net value of the content based on total number of likes, mentions, hashtags, followers, viewers, subscribers, score, and the likes obtained from one or more social network platforms supporting the one or more social media accounts of the first user;

generating, by the payment module, a revenue through a transaction processing fees and one or more SaaS subscriptions wherein the revenue from the transaction processing fees is generated through sponsored posts and membership and revenue from the SaaS subscriptions are generated by the first user and the plurality of third party sources; and allowing, by a non-fungible token swapping module, the first user to swap type of currency of the one or more non-fungible token across multiple networks.

* * * * *